US011067105B1

(12) United States Patent
Marquette et al.

(10) Patent No.: US 11,067,105 B1
(45) Date of Patent: Jul. 20, 2021

(54) FLANGE MOUNT CYLINDER SENSOR

(71) Applicant: Caterpillar Inc., Peoria, IL (US)

(72) Inventors: Matthew S. Marquette, Edelstein, IL (US); Timothy G. Sidles, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/797,957

(22) Filed: Feb. 21, 2020

(51) Int. Cl.
*F15B 15/28* (2006.01)
*F16J 15/16* (2006.01)

(52) U.S. Cl.
CPC ...... *F15B 15/2892* (2013.01); *F15B 15/2815* (2013.01); *F16J 15/16* (2013.01)

(58) Field of Classification Search
CPC .......................... F15B 15/2815; F15B 15/2892
See application file for complete search history.

(56) References Cited

U.S. PATENT DOCUMENTS

| 5,477,771 | A * | 12/1995 | Black ...................... F15B 15/28 92/108 |
| 6,450,048 | B1 * | 9/2002 | Samuelson ............ G01D 5/165 73/168 |
| 6,509,733 | B2 * | 1/2003 | Blubaugh ........... F15B 15/2892 324/207.13 |
| 7,023,199 | B2 * | 4/2006 | Blubaugh ........... F15B 15/2815 324/207.13 |
| 7,059,238 | B2 * | 6/2006 | Albright ............. F15B 15/2892 92/5 R |
| 7,121,185 | B2 * | 10/2006 | Alrefai ................ F15B 15/2815 91/1 |
| 7,353,749 | B2 | 4/2008 | Hamasagar |
| 7,634,155 | B2 | 12/2009 | Pawelski et al. |
| 7,855,551 | B2 * | 12/2010 | Steinich ............. F15B 15/2861 324/207.13 |
| 8,448,563 | B2 * | 5/2013 | Wenker ............... F15B 15/2892 92/5 R |
| 8,646,375 | B2 | 2/2014 | Terasaki et al. |
| 9,051,987 | B2 | 6/2015 | Murray et al. |
| 9,200,708 | B2 | 12/2015 | Desai et al. |
| 9,482,245 | B2 | 11/2016 | Palmer et al. |
| 2007/0139039 | A1 | 6/2007 | Steinich |
| 2020/0232486 | A1 * | 7/2020 | Rodrigues Da Costa ................... F15B 15/2815 |

FOREIGN PATENT DOCUMENTS

| CN | 103433836 B | 8/2015 |
| CN | 205349922 U | 6/2016 |
| CN | 106015172 | 3/2018 |

(Continued)

*Primary Examiner* — Michael Leslie
(74) *Attorney, Agent, or Firm* — Leydig, Voit & Mayer, Ltd.

(57) ABSTRACT

Cylinder sensor assembly includes a sensor with pressure pipe extending from the first sensor axial face of a sensor body, an annular face seal adapted to be disposed between the first sensor axial face and an endcap external axial face, and a sensor retention assembly. The sensor retention assembly includes a plurality of fasteners and a retainer body having a retainer distal face, a plurality of through holes and an internal chamber with a radially-extending flange extending into the internal chamber with the internal chamber open to the retainer distal face. The sensor body is disposed within the internal chamber adjacent the radially-extending flange.

20 Claims, 3 Drawing Sheets

(56) References Cited

FOREIGN PATENT DOCUMENTS

| | | |
|---|---|---|
| CN | 109743913 A | 5/2019 |
| DE | 102005060676 | 6/2007 |
| DE | 102007057413 B4 | 11/2009 |
| EP | 1435462 | 7/2004 |

* cited by examiner

FLANGE MOUNT CYLINDER SENSOR

TECHNICAL FIELD

This patent disclosure relates generally to fluid cylinders such as a hydraulic or pneumatic cylinder or the like, and, more particularly to an arrangement for mounting a sensor to a cylinder for determining positional information for a rod of the cylinder.

BACKGROUND

Various arrangements incorporate fluid cylinders. Sensors are mounted within the cylinders to provide information related to the length of the fluid cylinder. Failure of a sensor within a fluid cylinder may necessitate replacement, and failure of a cylinder may result in taking a machine out of operation entirely. Servicing such sensors may be difficult, however, due to limited or obstructed access to the sensors and potential damage that may result to the fluid cylinder during service.

U.S. Pat. No. 9,482,245 includes a casing that is attachable to the blind end of a cylinder with a sensor retention cap affixable to the casing. A locking pin extends through the casing and is position adjacent the sensor retention cap.

The present disclosure is directed to overcoming one or more of the problems as set forth above.

SUMMARY

The disclosure describes, in one aspect, a sensor assembly for use with a fluid cylinder group having a piston and rod assembly, and a cylinder group with an endcap external axial face having an axially-extending sensor port therethrough. The sensor assembly includes a sensor, an annular face seal, and a sensor retention assembly. The sensor includes a sensor body and a pressure pipe. The sensor body includes a first sensor axial face and a second sensor axial face, the pressure pipe extending axially from the first sensor axial face. The annular face seal is adapted to be disposed between the first sensor axial face and the endcap external axial face. The sensor retention assembly includes a plurality of fasteners and a retainer body. The retainer body includes a retainer distal face, a plurality of through holes and an internal chamber with a radially-extending flange. The radially-extending flange extends into the internal chamber and the internal chamber opens to the retainer distal face. The sensor body is disposed within the internal chamber with at least a portion of the second sensor axial face disposed adjacent the radially-extending flange. At least a portion of the first sensor axial face is adapted to be disposed adjacent the endcap external axial face with the pressure pipe extending from the sensor body through the axially-extending sensor port. The retainer distal face is adapted to be disposed adjacent the endcap external axial face. The plurality of fasteners is adapted to extend through the plurality of through holes of the retainer body to secure the sensor assembly to the endcap external axial face with the annular face seal disposed between the first sensor axial face and the endcap external axial face.

The disclosure describes, in another aspect, a cylinder group for operation with a piston and rod assembly. The cylinder group includes a cylinder body, an endcap member, a sensor, an annular face seal, and a sensor retention assembly. The cylinder body includes a cylindrical internal cavity therein having a longitudinal axis therethrough. The internal cavity includes an extend end and a retract end. The internal cavity is adapted for disposition of the piston and rod assembly for axial movement therein. The endcap member is disposed at the extend end of the cylinder body. The endcap member includes an endcap internal axial face, an endcap external axial face, and an axially-extending sensor port extending between the endcap internal axial face and the endcap external axial face. The sensor includes a sensor body and a pressure pipe. The sensor body includes a first sensor axial face and a second sensor axial face. At least a portion of the first sensor axial face is disposed adjacent the endcap external axial face with the pressure pipe extending from the sensor body through the axially-extending sensor port. At least one of the first sensor axial face and the endcap external axial face includes an annular recess. The annular face seal is at least partially disposed within the annular recess between the sensor body and the endcap member. The sensor retention assembly includes a retainer body. The retainer body includes a retainer distal face and an internal chamber with a radially-extending flange, the radially-extending flange extending into the internal chamber and the internal chamber opening to the retainer distal face. The sensor body is disposed within the internal chamber with at least a portion of the second sensor axial face disposed adjacent the radially-extending flange. The retainer body is coupled to the endcap member to secure the sensor to the endcap member.

The disclosure describes, in yet another aspect, a method of securing a sensor including a sensor body and a pressure pipe to a cylinder group. The method includes disposing an annular face seal within a first sensor axial face, assembling the sensor to an endcap member of the cylinder group by inserting the pressure pipe into an axially-extending sensor port through the endcap and disposing the first sensor axial face adjacent an endcap external axial face of the endcap member, receiving the sensor body within an internal chamber of a retainer body and disposing at least a portion of a second sensor axial face adjacent a radially-extending flange within the internal chamber, disposing a retainer distal face of the retainer body adjacent the endcap external axial face of the endcap member, inserting a plurality of fasteners through a respective plurality of through holes of the retainer body, and tightening the plurality of fasteners to secure the sensor and retainer body to the endcap.

BRIEF DESCRIPTION OF THE DRAWING(S)

DETAILED DESCRIPTION

Figure 1:
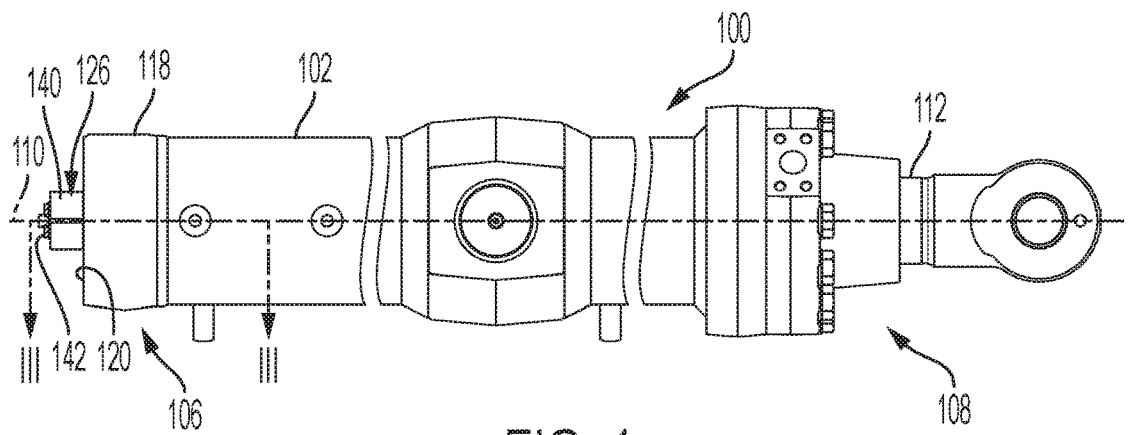
FIG. 1 is a side elevational view of a fluid cylinder incorporating teachings of this disclosure.
Figure 2:
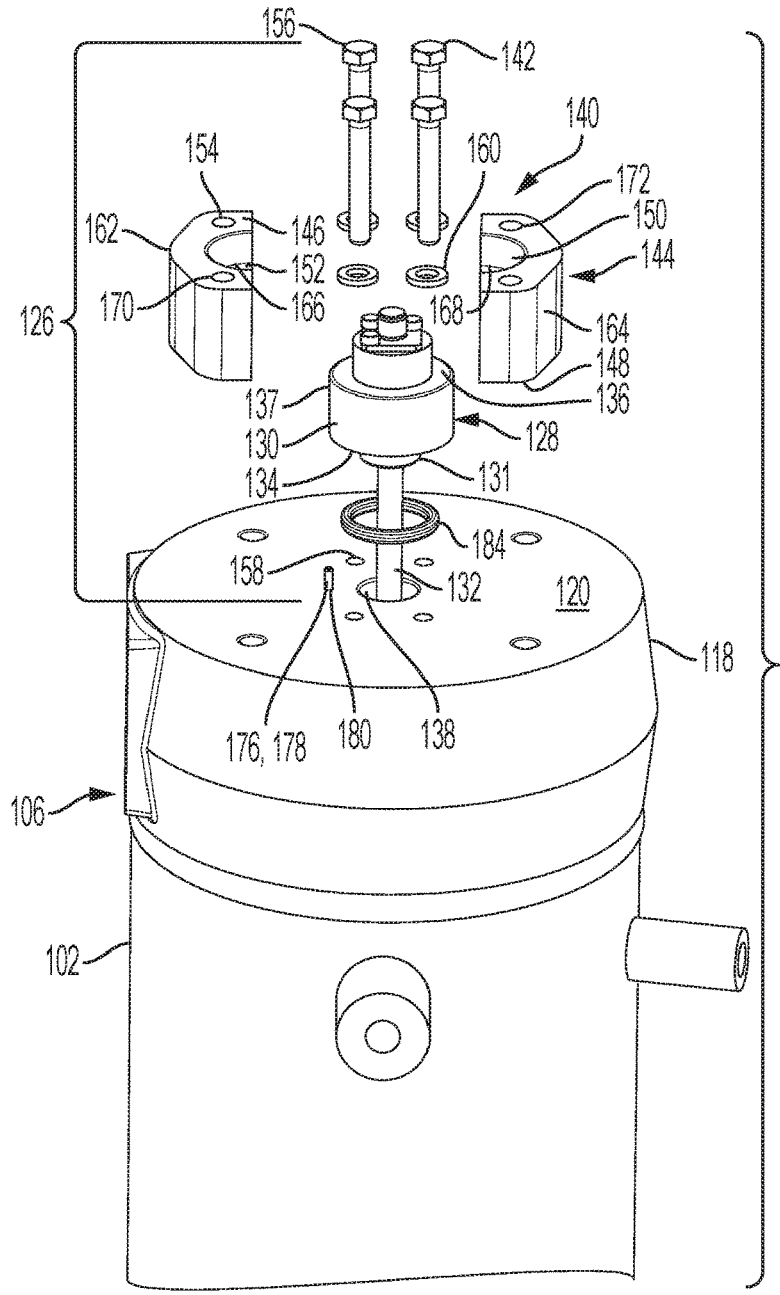
FIG. 2 is an enlarged, exploded, isometric view of the end of the fluid cylinder of FIG. 1.
Figure 3:
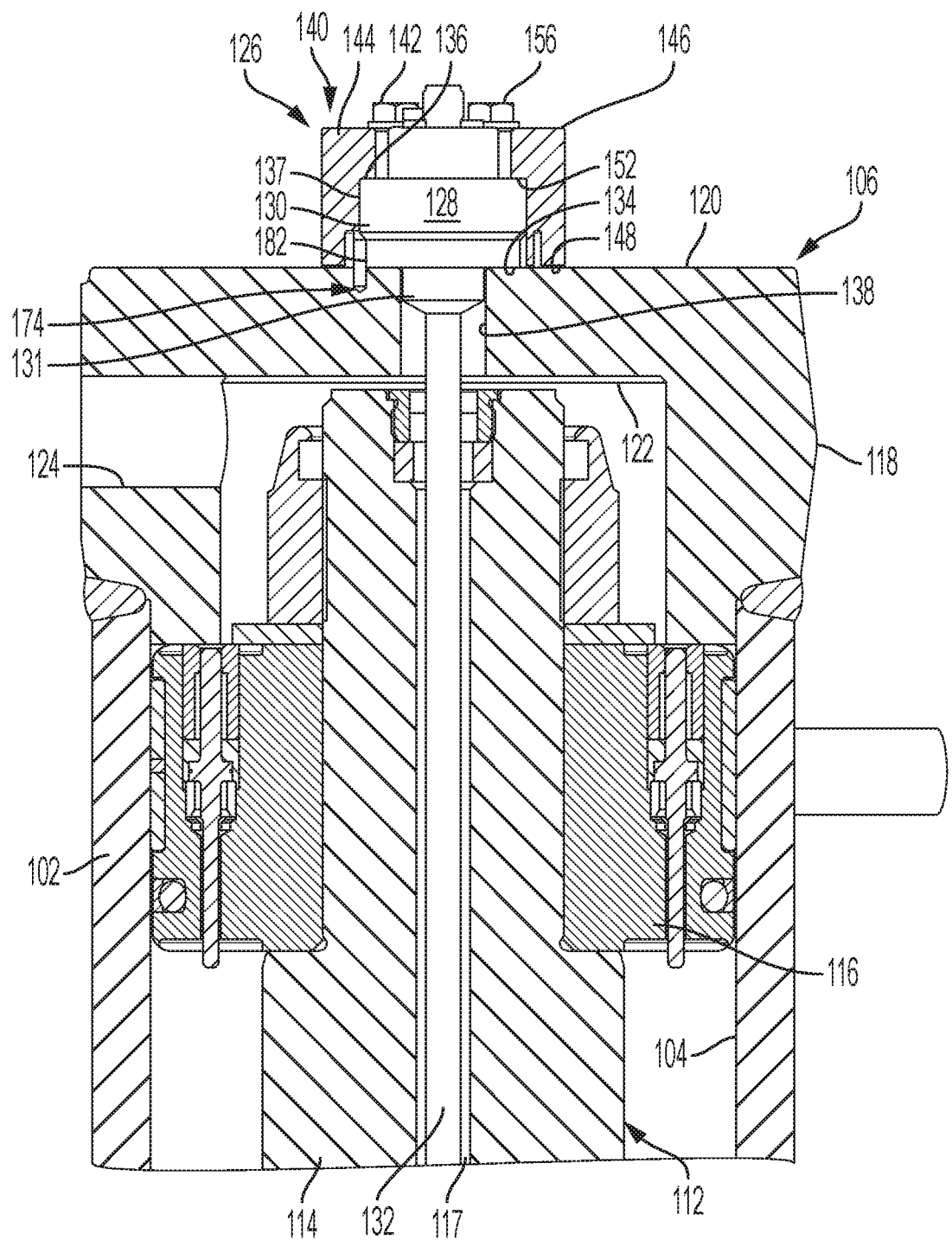
FIG. 3 is an enlarged, cross-sectional view of the end of the fluid cylinder of taken along line III-III in FIG. 1.

This disclosure relates to fluid cylinders, such as hydraulic cylinders, pneumatic cylinders, and the like. An exemplary fluid cylinder group 100 is illustrated in FIG. 1, while an exploded, fragmentary view of the cylinder group 100 is illustrated in FIG. 2, a fragmentary, cross-section of the cylinder group 100 is illustrated in FIG. 3, and an enlarged, fragmentary cross-sectional view in FIG. 4. The fluid cylinder group 100 includes a cylinder body 102 having an internal cavity 104, which is visible in the cross-section of FIG. 3. The internal cavity 104 has an extend end 106 (to the left as illustrated in FIG. 1), a retract end 108 (to the right as illustrated in FIG. 1) and a longitudinal axis 110 extending therethrough. The extend end 106 is visible in FIG. 3. A piston and rod assembly 112 is disposed in the internal cavity 104 for axial movement therein. Again, referring to FIG. 3, the piston and rod assembly 112 includes a rod 114 having an axial end connected to a piston 116, and an opposite axial end, which extends outwardly from the cylinder body 102 in the conventional manner (see FIG. 1). The rod 114 may include an axial passage 117, the significance of which is explained below. It is recognized that the piston and rod assembly 112 could be a ram member wherein the end of the rod/ram portion forms the piston, as opposed to the piston being a separate element coupled to the rod.

As best seen in FIG. 3, the fluid cylinder group 100 further includes an endcap member 118 having an endcap external axial face 120 and an endcap internal axial face 122 disposed to close the extend end 106 of the internal cavity 104 of the cylinder body 102. The endcap member 118 may further include a fluid port 124 through which fluid may be introduced into the internal cavity 104 of the cylinder body 102.

Figure 4:
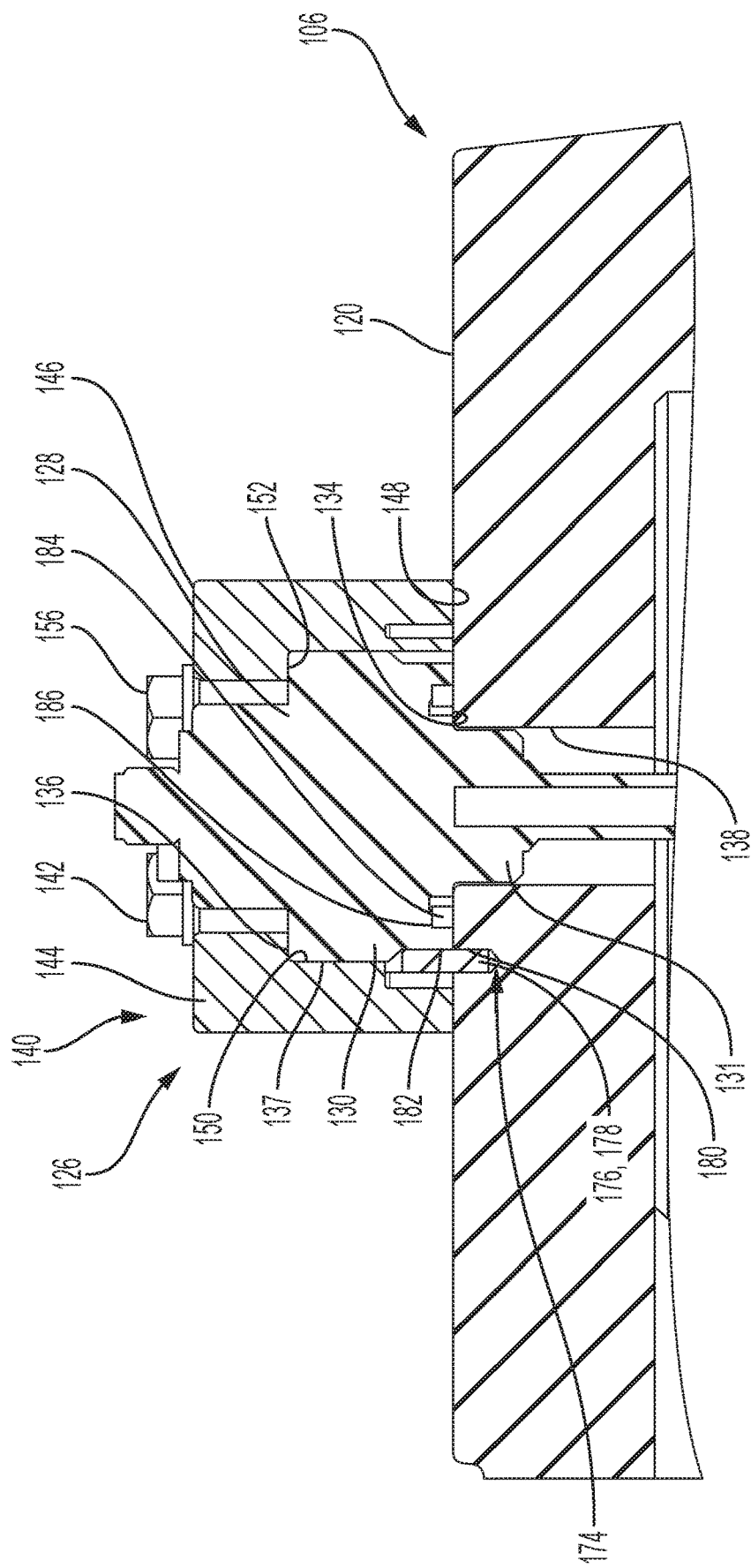
FIG. 4 is an enlarged, fragmentary, cross-sectional view of a sensor assembly mounted to an endcap of the fluid cylinder.

As best seen in FIGS. 2-4, the fluid cylinder group 100 further includes a sensor assembly 126 that includes a sensor 128. Sensor 128 shown is a conventionally operable magnetostrictive type sensor typically used for determining the position of an object such as piston and rod assembly 112 relative to another object or location. The sensor 128 includes a sensor body 130 and a pressure pipe 132. The sensor body 130 includes a first sensor axial face 134 from which the pressure pipe 132 extends, and a second sensor axial face 136 disposed opposite the first sensor axial face 134, and a peripheral surface 137 extending between the first sensor axial face 134 and the second sensor axial face 136. In accordance with an aspect of this disclosure, the sensor body 130 may include a cylinder protrusion 131 extending axially from the first sensor axial face 134, the pressure pipe 132 extending axially from the cylinder protrusion 131. In operation, the pressure pipe 132 extends axially into internal cavity 104. Pressure pipe 132 is cooperatively telescopically received within the axial passage 117 extending into and through at least a substantial portion of rod 114. While the operation of the sensor 128 is not discussed in detail in this disclosure, the operation will be understood by those of skill in the art.

In accordance with an aspect of this disclosure, the endcap member 118 includes an axially-extending sensor port 138, and at least a portion of the first sensor axial face 134 of the sensor body 130 is disposed along the endcap external axial face with the pressure pipe 132 extending through the sensor port 138 into the cylindrical internal cavity 104 of the cylinder body 102. As illustrated, for example, in FIG. 3, a portion of the sensor body 130, such as the cylinder protrusion 131, may likewise extend into the sensor port 138. It will be appreciated that the engagement of the cylinder protrusion 131 with the sensor port 138 may assist in assembly of the sensor 128 with the endcap member 118 and may provide a durable structure that is resistant to movement of the pressure pipe 132 relative to the sensor body 130.

According to another aspect of this disclosure, the sensor assembly 126 further includes a sensor retention assembly 140 that receives the sensor body 130 and secure the sensor assembly 126 in position on the endcap member 118. The sensor retention assembly includes a retainer body 144 and at least one fastener 142. The retainer body 144 includes a retainer proximal face 146, a retainer distal face 148, and an internal chamber 150 opening to the retainer distal face 148. The retainer body 144 further includes a radially-extending flange 152 that is spaced from the retainer distal face 148 to at least partially define a proximal axial end of the internal chamber 150. In assembly, the sensor body 130 is received within the internal chamber 150 with at least a portion of the second sensor axial face 136 disposed against the radially-extending flange 152. In assembly, the retainer distal face 148 and the first sensor axial face 134 are disposed against the endcap external axial face 120, and the retainer body 144 is secured to the endcap member 118 with the fastener 142 to secure the sensor 128 in the assembled position. It will be appreciated that during assembly, the pressure pipe 132 of the sensor 128 may be assembled into the sensor port 138 prior to or following the assembly of the sensor 128 with the retainer body 144.

The retainer body 144 may be coupled to the endcap member 118 with the fastener 142 by an appropriate arrangement. In at least one embodiment, the retainer body 144 includes a plurality of through holes 154 through which a plurality of fasteners 142 extend, as may be seen in FIG. 2. The fasteners 142 may be threaded fasteners, such as bolts 156, that may be assembled to extend through the plurality of through holes 154 and be received in corresponding threaded holes 158 in the endcap member 118. It will be appreciated that the bolts 156 may likewise extend through respective washers 160.

It will further be appreciated that the retainer body 144 may be formed as a unitary piece, or in a plurality of components. For example, as best seen in FIG. 2, the retainer body 144 may include at least two retainer elements 162, 164, as in the illustrated embodiment. In the illustrated embodiment, each of the retainer elements 162, 163 is arcuately shaped. Further, each of the retainer elements 162, 164 includes an arcuate radially-extending flange 166, 168 which together form the radially-extending flange 152 against which the second sensor axial face 136 is disposed when assembled to the endcap member 118. Each retainer element 162, 164 further includes a plurality of through holes 170, 172 through which a plurality of fasteners 142 are disposed to secure the retainer elements 162, 164 to the endcap member 118.

In order to assist in proper orientation of the sensor 128 and retainer body 144 relative to the endcap member 118, a sensor assembly orienting arrangement 174 may be provided (see FIGS. 3 and 4). In at least one embodiment, the sensor assembly orienting arrangement 174 includes at least one of the sensor body 130 and the endcap member 118 including a protrusion 176 adapted to be received in a recess in the other of the sensor body 130 and the endcap member 118. In the illustrated embodiment, for example, the protrusion 176 is a rod 178 received in a bore 180 in the endcap member 118, and extending from the endcap external axial face 120 (as also shown in FIG. 2), and an axially extending recess 182 provided in the peripheral surface 137 of the sensor body 130 (as best seen in FIG. 4).

In order to provide a seal between the sensor 128 and the endcap member 118, an annular face seal 184 is disposed between the sensor body 130 and the endcap member 118. Those of skill in the art will appreciate that the use an annular face seal 184, and the placement between the sensor 128 and the endcap member 118 not only facilitates accurate assembly, but also provides a direct and reliable seal between the sensor 128 and the endcap member 118. In order to retain the annular face seal 184, an annular recess 186 is provided in at least one of the first sensor axial face 134 and the endcap external axial face 120. In the illustrated embodiment, the annular recess 186 is provided in the first sensor axial face 134. While the annular face seal 184 may have any appropriate cross-section, in at least one embodiment, the annular face seal 184 includes a D-shaped cross-section. Accordingly, the rounded portion of the cross-section may be received in the annular recess, while the flat portion of the cross-section may be disposed against a flat surface when the first sensor axial face 134 and the endcap external axial face 120 are disposed adjacent one another, or vice versa.

INDUSTRIAL APPLICABILITY

The present disclosure is applicable to fluid cylinders, including hydraulic cylinders, pneumatic cylinders, and the like.

Some embodiments of the sensor assembly 126 may provide a reliable structure and method for assembling a sensor to a cylinder group 100. As the sensor retention assembly 140 includes fasteners 142 that are readily assessable from the extend end 106 of the cylinder group 100, and the sensor 128 may be removed from the extend end 106, some embodiments may provide a readily serviceable arrangement that may minimize the cost of servicing.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A sensor assembly for use with a fluid cylinder group having a piston and rod assembly, and a cylinder group including an endcap member with an endcap external axial face having an axially-extending sensor port therethrough, the sensor assembly comprising:
    a sensor including a sensor body and a pressure pipe, the sensor body comprising a first sensor axial face and a second sensor axial face, the pressure pipe extending axially from the first sensor axial face,
    an annular face seal adapted to be disposed between the first sensor axial face and the endcap external axial face, and
    a sensor retention assembly comprising a plurality of fasteners and a retainer body, the retainer body comprising a retainer distal face, a plurality of through holes and an internal chamber with a radially-extending flange, the radially-extending flange extending into the internal chamber and the internal chamber opening to the retainer distal face, the sensor body being disposed within the internal chamber with at least a portion of the second sensor axial face disposed adjacent the radially-extending flange,
    at least a portion of the first sensor axial face being adapted to be disposed adjacent the endcap external axial face with the pressure pipe extending from the sensor body through the axially-extending sensor port, the retainer distal face being adapted to be disposed adjacent the endcap external axial face, the plurality of fasteners being adapted to extend through the plurality of through holes of the retainer body to secure the sensor assembly to the endcap external axial face with the annular face seal disposed between the first sensor axial face and the endcap external axial face.

2. The sensor assembly of claim 1 wherein the first sensor axial face comprises an annular recess, the annular face seal being disposed at least partially within the annular recess.

3. The sensor assembly of claim 1 wherein the annular face seal comprises a D-shaped cross-section.

4. The sensor assembly of claim 1 wherein the retainer body includes at least two retainer elements.

5. The sensor assembly of claim 1 wherein the retainer body comprises two arcuate retainer elements, and the radially-extending flange comprises arcuate radially-extending flanges within each of the two retainer elements.

6. The sensor assembly of claim 1 wherein the plurality of fasteners includes a plurality of threaded fasteners adapted to extend through the plurality of through holes and into the endcap external axial face.

7. The sensor assembly of claim 1 further comprising a sensor assembly orienting arrangement comprising at least one of the sensor body and the endcap member including a protrusion adapted to be received in a recess in the other of the sensor body and the endcap member.

8. A cylinder group for operation with a piston and rod assembly, the cylinder group comprising:
    a cylinder body comprising a cylindrical internal cavity therein including a longitudinal axis therethrough, the internal cavity including an extend end and a retract end, the internal cavity being adapted for disposition of the piston and rod assembly for axial movement therein,
    an endcap member disposed at the extend end of the cylinder body, the endcap member comprising an endcap internal axial face, an endcap external axial face, and an axially-extending sensor port extending between the endcap internal axial face and the endcap external axial face,
    a sensor including a sensor body and a pressure pipe, the sensor body comprising a first sensor axial face and a second sensor axial face, at least a portion of the first sensor axial face being disposed adjacent the endcap external axial face with the pressure pipe extending from the sensor body through the axially-extending sensor port, an annular face seal, at least one of the first sensor axial face and the endcap external axial face comprising an annular recess, the annular face seal being at least partially disposed within the annular recess between the sensor body and the endcap member, and a sensor retention assembly comprising a retainer body, the retainer body comprising a retainer distal face and an internal chamber with a radially-extending flange, the radially-extending flange extending into the internal chamber and the internal chamber opening to the retainer distal face, the sensor body being disposed within the internal chamber with at least a portion of the second sensor axial face disposed adjacent the radially-extending flange, the retainer body being coupled to the endcap member to secure the sensor to the endcap member.

9. The cylinder group of claim 8 wherein the first sensor axial face comprises the annular recess.

10. The cylinder group of claim 8 wherein the annular face seal comprises a D-shaped cross-section.

11. The cylinder group of claim 8 wherein the retainer body includes at least two retainer elements.

12. The cylinder group of claim 8 wherein the sensor retention assembly further comprises a plurality of fasteners securing the retainer body to the endcap external axial face.

13. The cylinder group of claim 8 wherein the retainer body comprises two arcuate retainer elements, and the radially-extending flange comprises arcuate radially-extending flanges within each of the two retainer elements.

14. The cylinder group of claim 13 wherein the sensor retention assembly further comprises a plurality of fasteners, each said arcuate retainer element including two through holes, the plurality of fasteners extending through respective through holes to secure the retainer body to the endcap external axial face.

15. The cylinder group of claim 8 further comprising a sensor assembly orienting arrangement comprising at least one of the sensor body and the endcap member including a protrusion adapted to be received in a recess in the other of the sensor body and the endcap member.

16. The cylinder group of claim 15 wherein the sensor body includes a peripheral surface extending between the first sensor axial face and the second sensor axial face, and wherein the protrusion is a rod extending from the endcap external axial face, and the peripheral surface of the sensor body includes the recess.

17. A method of securing a sensor including a sensor body and a pressure pipe to a cylinder group, the method comprising:

disposing an annular face seal within a first sensor axial face, assembling the sensor to an endcap member of the cylinder group by inserting the pressure pipe into an axially-extending sensor port through the endcap member and disposing the first sensor axial face adjacent an endcap external axial face of the endcap member, receiving the sensor body within an internal chamber of a retainer body and disposing at least a portion of a second sensor axial face adjacent a radially-extending flange within the internal chamber, disposing a retainer distal face of the retainer body adjacent the endcap external axial face of the endcap member, inserting a plurality of fasteners through a respective plurality of through holes of the retainer body, and tightening the plurality of fasteners to secure the sensor and retainer body to the endcap member.

18. The method of claim 17 wherein receiving the sensor body within the internal chamber of the retainer body comprises assembling two arcuate retainer elements of the retainer body around the sensor body with arcuate radially-extending flanges within each of the two retainer elements adjacent at least a portion of the second sensor axial face.

19. The method of claim 18 wherein inserting the plurality of fasteners comprises inserting two fasteners through two through holes in each of the arcuate retainer elements.

20. The method of claim 19 wherein assembling the sensor to the endcap member comprises orienting a rod extending from the endcap external axial face into a recess in the sensor body.

\* \* \* \* \*